(12) United States Patent  
Schatz

(10) Patent No.: US 6,198,379 B1
(45) Date of Patent: Mar. 6, 2001

(54) SEMICONDUCTOR COMPONENT WITH PIEZORESISTIVE MEASURING SHUNTS

(75) Inventor: Oliver Schatz, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/096,090

(22) Filed: Jun. 11, 1998

(30) Foreign Application Priority Data

Jun. 19, 1997 (DE) .............................................. 197 25 994

(51) Int. Cl.[7] .................................................. H01C 10/10
(52) U.S. Cl. ............................ 338/42; 257/419; 73/721; 73/727
(58) Field of Search ................ 338/36, 42, 47; 257/419; 73/721, 727

(56) References Cited

U.S. PATENT DOCUMENTS

| 3,341,794 | * | 9/1967 | Stedman | 338/4 |
| 3,537,319 | * | 11/1970 | Yerman | 73/727 |
| 3,918,019 | * | 11/1975 | Nunn | 338/42 |
| 4,439,752 | * | 3/1984 | Starr | 338/2 |
| 4,530,244 | * | 7/1985 | Starr | 73/727 |
| 5,170,237 | * | 12/1992 | Tsuda et al. | 73/721 |
| 5,349,867 | * | 9/1994 | Park | 73/727 |
| 5,412,993 | * | 5/1995 | Ohtani | 338/42 |
| 5,537,882 | * | 7/1996 | Ugai et al. | 73/727 |
| 5,812,047 | * | 9/1998 | van Kampen | 338/42 |

* cited by examiner

Primary Examiner—Karl D. Easthom
(74) Attorney, Agent, or Firm—Kenyon & Kenyon

(57) ABSTRACT

A circuit arrangement implemented as an integrated semiconductor component has a measured value acquisition circuit that can be connected to an analysis circuit, in particular a piezoresistive measuring bridge containing piezoresistive measuring shunts diffused on a semiconductor substrate. The piezoresistive measuring shunts are connected to metallic terminal contacts by diffused terminal resistors having a negligible piezoresistive resistance. To avoid terminal-related offset errors on the measuring shunts in particular, the terminal resistors are designed as identical, elongated, generally curved area structures that taper toward the front end and are connected to a measuring shunt on the front end and to a metallic terminal contact on the opposite end.

10 Claims, 2 Drawing Sheets

SEMICONDUCTOR COMPONENT WITH PIEZORESISTIVE MEASURING SHUNTS

FIELD OF THE INVENTION

The present invention relates to a circuit arrangement implemented as an integrated semiconductor component.

BACKGROUND INFORMATION

It is known that an integrated semiconductor component can be designed as a component for a weight determination, where piezoresistive measuring shunts are connected to a membrane acted on by a mass to be weighed. There is no direct contact of the diffused measuring shunts with metallic terminal contacts to connect the measuring shunts to an analysis circuit to avoid effects on the measuring shunts due to different temperature coefficients of metal and semiconductor substrate. For this purpose, in a conventional semiconductor component, the measuring shunts are not connected directly to the metallic terminals but instead are connected to the metallic terminals across terminal resistors. The terminal resistors are formed with a negligible piezoresistive sensitivity. Thus, the terminal resistors may include a low-resistance diffusion level, which is superimposed on another diffusion level, usually the diffusion level of the measuring shunts. Although the piezoresistive measuring shunts can be adequately isolated from the metallic terminal contacts with respect to thermal effects using such terminal resistors, these terminal resistors result in additional problems because of their close proximity and connection to the measuring shunts. These problems include offset errors, because the terminal resistors have a different size and shape. Furthermore, there is the risk of bypass connections between adjacent terminal resistors, because these adjacent terminal resistors usually extend parallel to one another over a relatively great distance starting from their connection to the measuring shunts. Furthermore, an offset between the diffusion levels of the measuring shunts and the terminal resistors leads to additional offset errors of the measuring bridge. In addition, it is not always guaranteed that the terminal resistors can be designed to have a sufficiently low resistance so as not to impair the sensitivity of the measuring bridge.

SUMMARY OF THE INVENTION

The circuit arrangement according to the present invention is advantageous in that the terminal resistors are formed identically and have a predetermined shape. The terminal resistors have a predetermined minimum mutual spacing therebetween to prevent bypass connections from developing in parallel to the measuring shunts, despite the paired arrangement in direct proximity owing to their contact with the measuring shunts. Offset errors on the respective measuring shunt over the terminal resistors are prevented due to their identical shape and size. Because of their special shape, the terminal resistors may be alternately arranged with no problem in parallel or perpendicularly to one another on a measuring shunt, with the result being achieved in any position of the terminal resistors on a measuring shunt that a vertical offset between the diffusion level of the measuring shunts and the diffusion level of the terminal resistors results in a change in the terminal conditions in a similar manner, so that the absolute values of the individual resistors in each half bridge of the measuring shunts which are combined to form a measuring bridge change in the same sense. Thus, there is no offset error in the measuring bridge. The same ratiolization applies for a horizontal offset of these diffusion levels which influences all the bridge resistors equally, so that no offset error occurs in this case either.

According to another embodiment of the circuit arrangement according to the present invention, each terminal contact includes three contiguous area elements (e.g., a large-area base body in relation to the other area elements for connection to a metallic terminal element) and a head for connection to a measuring shunt. The head has a very small-area in relation to the base body, and has rotational or mirror symmetry within itself. The head is arranged with a lateral offset to said base body, and a neck connecting the base body to the head and widening, preferably continuously, from the small-area head to the large-area base body. The metallic terminal element is arranged in or on a location on the base body which is at a maximum distance from said head. The symmetrical design of the head ensures that the terminal conditions for the respective measuring shunt are almost identical, regardless of its location. This eliminates offset errors due to the terminal. The continuous widening of the neck starting from the head of the terminal resistor to its base body results in a low overall resistance value. The lateral offset arrangement of the head with respect to the base body and the resulting inclined arrangement of the neck achieves the result that, regardless of the position of the measuring shunt within the circuit arrangement, provides a minimum distance between adjacent terminal resistors of a measuring shunt only for a short distance and the distance increases again as soon as possible, which prevents bypass connections.

The elongated basic shape of the uniformly designed terminal resistor according to the present invention and the position of the contacts relative to the measuring shunt or to the terminal contact results in a large distance between the measuring shunt and the terminal contact which is almost position-independent.

The base body is designed to be rectangular and one of its narrow sides develops into the neck. The rectangular shape ensures problem-free manufacturing of the base body, and the orientation of the rectangle with the narrow side connecting to the neck then guarantees a maximum distance between the terminal contact and the measuring shunt.

The neck generally has a predetermined curvature to ensure a minimum distance between neighboring terminal resistors and the same measuring shunt regardless of their position. The curved shape of the neck can also be approximated by appropriate trapezoidal sections.

The resistor head is designed with a square shape, with the corners of the square preferably being chamfered for connection of a measuring shunt. Alternatively, the resistor head may also be designed as a rectangle, which is different from the square shape, and the corner chamfer may also be omitted so as to not to result in any position-dependent terminal conditions for the measuring shunt due to process-specific diffusion behavior.

The terminal resistors are advantageously covered with a cover layer having a doping corresponding to a doping of the respective measuring shunt.

DETAILED DESCRIPTION OF THE INVENTION

Figure 1:
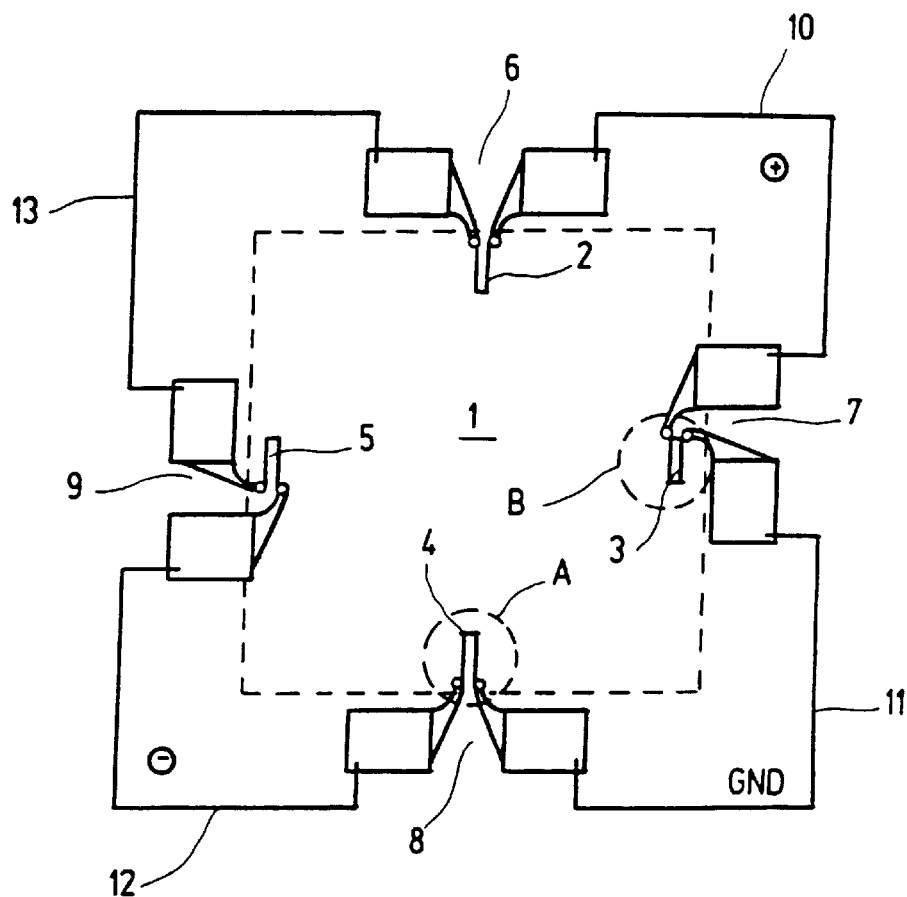
FIG. 1 shows a schematic diagram of a first embodiment of the circuit arrangement according to the present invention having a form of a piezoresistive measuring bridge.

As shown in FIG. 1, the circuit arrangement implemented as an integrated semiconductor component has a centrally arranged square membrane 1 and four piezoresistive measuring shunts 2, 3, 4, 5 which are arranged on membrane 1 and are connected by pairs of terminal resistors 6, 7, 8, 9 to metallic terminals or metal platings in outer corner areas of the terminal resistors 6, 7, 8, 9. The pairs of terminal resistors 6, 7, 8, 9 are bridged to one another by metallic contact paths 10, 11, 12, 13. The circuit arrangement shown in FIG. 1 is mounted on a semiconductor substrate (not shown).

The individual measuring shunts 2, 3, 4, 5 are not connected directly to the metallic contacts to prevent effects on the measuring shunts 2, 3, 4, 5 due to different temperature coefficients of the metal and the substrate. Instead, piezoresistive measuring shunts 2, 3, 4, 5 are connected to metallic terminals (i.e, lines or metallic contact paths) 10, 11, 12, 13 indirectly via the terminal resistors of resistor pairs 6, 7, 8, 9 which are made of highly doped diffusion layers having a negligible piezoresistive sensitivity. The low-resistance diffusion levels forming the terminal resistors preferably have another diffusion level superimposed on them, (e.g., of measuring shunts 2, 3, 4, 5).

Figure 2:
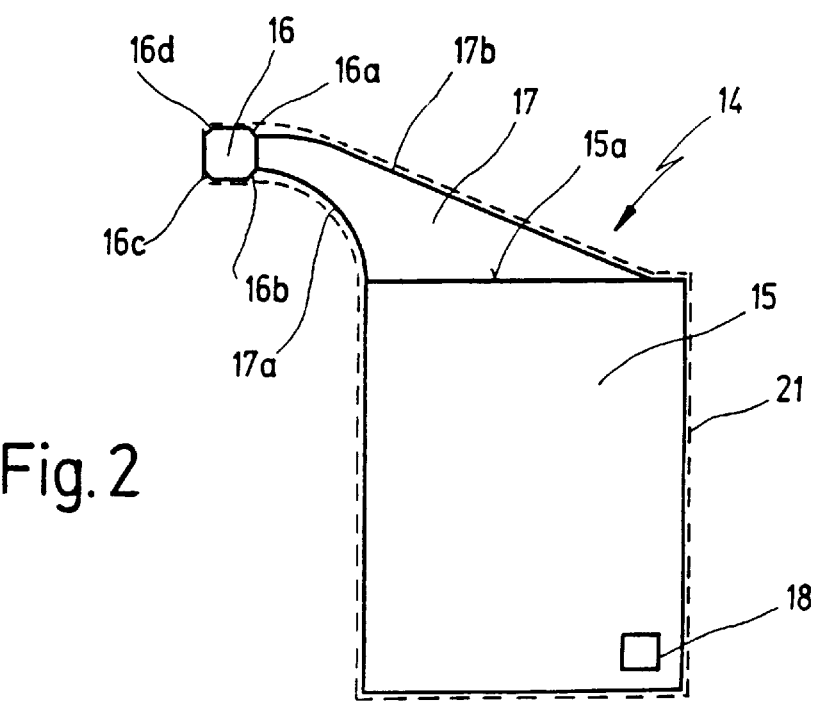
FIG. 2 shows a detailed diagram of one of the terminal resistors in the circuit arrangement illustrated in FIG. 1.

According to the present invention, all terminal resistors of terminal resistance pairs 6, 7, 8, 9 are identically designed. A corresponding individual universal terminal resistor 14 is shown in FIG. 2. As shown in FIG. 2, terminal resistor 14 has an elongated, generally curved shape and includes three contiguous area elements: a rectangular base body 15 having a relatively large area relative to the other area elements, a head 16 having rotational or mirror symmetry, (e.g., a square shape), a very small area and a lateral offset relative to base body 15. Corners 16a, 16b, 16c and 16d of head 16 is chamfered for connecting a measuring shunt, and a neck 17 connecting base body 15 to head 16 and extending from one side of square head 16 to the opposite narrow side 15a of rectangular base body 15, and gradually widens. Rectangular base body 15 includes a metallic terminal contact 18 in the bottom corner (as shown in FIG. 2) which represents the point the farthest distance from head 16 within terminal resistor 14. Because of the laterally offset arrangement of head 16 relative to base body 15, neck 17 has a relatively tight curved side edge 17a and an elongated edge 17b curving less than curved side edge 17a. The shape of terminal resistor 14 shown in FIG. 4 provides an optimal relative arrangement of two terminal resistors with a shape similar to one shown in the circuit of FIG. 1, so that mutually unfavorable disadvantages or those having a negative effect on the respective measuring shunt are avoided, as described below with respect to FIGS. 3 and 4.

Figure 3:
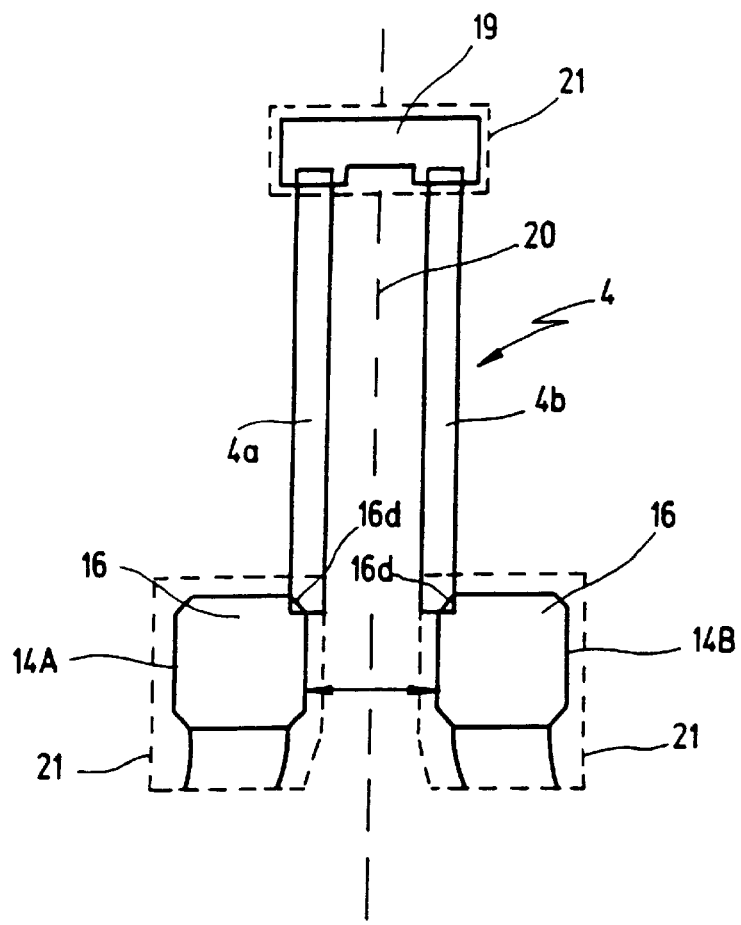
FIG. 3 shows an enlarged view of a first dotted-line circle A illustrated in FIG. 1.
Figure 4:
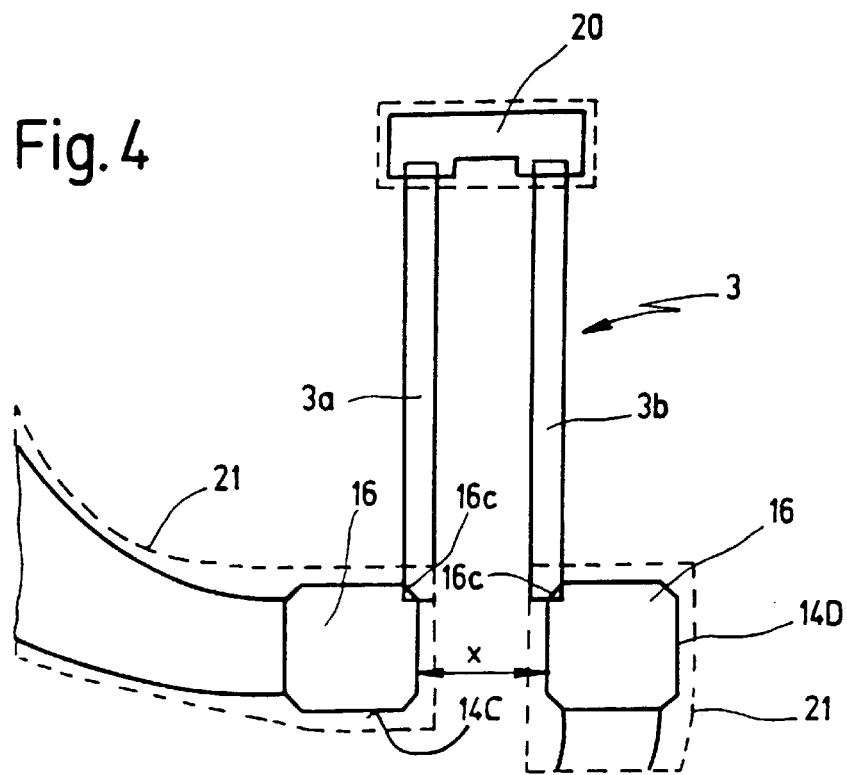
FIG. 4 shows an enlarged view of a second dotted-line circle B illustrated in FIG. 1.

FIGS. 3 and 4 each show details of the arrangement of a pair of terminal resistors shaped similarly to the universal terminal resistor 14 illustrated in FIG. 2 for contacting a measuring shunt 3 or 4. In FIGS. 3 and 4, the terminal resistors corresponding to terminal resistor 14 shown in FIG. 2 are labeled as 14A, 14B and 14C, 14D. The heads of terminal resistors 14A, 14B and 14C, 14D and the directly adjacent neck areas are shown in FIGS. 3 and 4, with the remaining relative position of these terminal resistors 14A, 14B and 14C, 14D per pair of terminal resistors illustrated in FIG. 1.

As shown in FIGS. 3 and 4, measuring shunt 3 or 4 has an identical configuration of rectangular strip resistance sections 3a, 3b, and 4a, 4b of the same size which are connected to one another at their ends by a short-circuiting link 19 and 20, respectively. Rectangular strip resistance sections 3a, 3b, and 4a, 4b are connected at their other ends to the chamfered corners 16d, 16d and 16c, 16c, of heads 16 of terminal resistors 14A, 14B and 14C, 14D, respectively. The difference between the arrangement shown in FIG. 3 and the arrangement shown in FIG. 4 is that terminal elements 14A, 14B according to FIG. 3 are arranged symmetrically to the longitudinal axis of measuring shunt 4, while in FIG. 4, terminal elements 14C, 14D are rotated by 90° and have a slight lateral offset relative to an axis which is located between the heads of terminal resistors on longitudinal axis 20 (indicated with an "x" In FIG. 4) perpendicular to the longitudinal axis.

As shown in FIG. 1, the following advantages are achieved because of the selected mutual arrangement of terminal resistors within a pair of terminal resistors 6, 7, 8, 9 and because of the uniform shape of these terminal resistors corresponding to the shape of terminal resistor 14 illustrated in FIG. 2: optimum mutual arrangements of the terminal resistors within the respective pair of terminal resistors can be achieved by the specular or rotational symmetry of the basic resistor shape; the highly symmetrical shape of resistor head 16 ensures that the terminal conditions for the measuring shunts are almost identical regardless of their position, thus eliminating terminal-related offset errors; the continuous widening of neck 17 from resistor head 16 to base body 15 yields a small resistance value on the whole arrangement; the curved shape of neck 17 provides a minimum distance between neighboring terminal resistors of a pair for only a short path, regardless of the position of the measuring shunts, and this distance is increased as soon as possible, thus avoiding bypass connections; the elongated basic shape and the position of terminal contact 18 within base body 15 result in a large distance between the measuring bridge and metallic terminal contact 18, regardless of their position.

In addition, a vertical offset between the diffusion level of the terminal resistors and the diffusion level of the measuring shunts results in changes in the same direction in the terminal conditions of the measuring shunts at each half-bridge of the measuring shunt bridge. This causes changes in the same direction in the absolute values of the individual resistors in each half-bridge, so that no offset errors occur.

FIGS. 2, 3 and 4 show a covering layer 21 for terminal resistors 14, 14A, 14B, 14C, 14D, indicated with dotted lines. This covering layer is a doped diffusion layer whose doping corresponds to a doping of the diffusion layer, which, e.g., forms the measuring shunts and has weak $p^-$-type doping. In the arrangement according to the present invention, the terminal resistors are highly doped with $p^+$-type dopant, similar to that of short-circuit bridge 19 which is covered with the same covering layer 21 as the terminal resistors.

What is claimed is:

1. A circuit arrangement implemented as an integrated semiconductor component and having a measured value acquisition circuit connectable to an analysis circuit, the circuit arrangement comprising:

piezoresistive measuring shunts diffused on a semiconductor substrate, the analysis circuit including the piezoresistive measuring shunts;

diffused terminal resistors having a negligible piezoresistive resistance, the diffused terminal resistors including identical, elongated, curved structures; and metallic terminal contacts connected to the piezoresistive measuring shunts by the diffused terminal resistors, wherein each of the curved structures has a first end for coupling to one of the piezoresistive measuring shunts and a second end, opposite the first end, for coupling to one of the metallic terminal contacts, each of the curved structures tapering toward the first end, and wherein the first end expands from the taper to a rectangular or square shape.

2. The circuit arrangement according to claim 1, wherein each of the diffused terminal resistors includes:
a base body including a first area for connecting to the metallic terminal contacts,
a head portion having one of a rotational symmetry and a mirror symmetry and positioned at a predetermined distance from the base body, the head portion including a second area for connecting to the piezoresistive measuring shunts, the second area being smaller than the first area, and
a neck portion coupling the base body to the head portion, the neck portion having a cross section increasing from the head portion to the base body, wherein the metallic terminal contacts are positioned at a location of the base body, the location being positioned at a maximum distance away from the head portion.

3. The circuit arrangement according to claim 2, wherein the base body has a rectangular shape and has a narrow side adjacent to the neck portion.

4. The circuit arrangement according to claim 2, wherein the neck portion has a curved shape.

5. The circuit arrangement according to claim 1, wherein two of the diffused terminal resistors are arranged in a pair and in a side-by-side manner on at least one of the piezoresistive measuring shunts.

6. The circuit arrangement according to claim 1, wherein the diffused terminal resistors are covered with a layer having a first doping, the piezoresistive measuring shunts having a second doping, the first doping substantially corresponding to the second doping.

7. The circuit arrangement according to claim 1, wherein the diffused terminal resistors are formed in a highly-doped, low-resistance diffusion level.

8. The circuit arrangement according to claim 1, wherein the analysis circuit includes a piezoresistive measuring bridge.

9. A circuit arrangement implemented as an integrated semiconductor component and having a measured value acquisition circuit connectable to an analysis circuit, the circuit arrangement comprising:

piezoresistive measuring shunts diffused on a semiconductor substrate, the analysis circuit including the piezoresistive measuring shunts;

diffused terminal resistors having a negligible piezoresistive resistance, the diffused terminal resistors including identical, elongated, curved structures; and metallic terminal contacts connected to the piezoresistive measuring shunts by the diffused terminal resistors, wherein each of the curved structures has a first end for coupling to one of the piezoresistive measuring shunts and a second end, opposite the first end, for coupling to one of the metallic terminal contacts, each of the curved structures tapering toward the first end wherein each of the diffused terminal resistors includes:
a base body including a first area for connecting to the metallic terminal contacts,
a head portion having one of a rotational symmetry and a mirror symmetry and positioned at a predetermined distance from the base body, the head portion including a second area for connecting to the piezoresistive measuring shunts, the second area being smaller than the first area, and
a neck portion coupling the base body to the head portion, the neck portion having a cross section increasing from the head portion to the base body, wherein the metallic terminal contacts are positioned at a location of the base body, the location being positioned at a maximum distance away from the head portion, wherein the head portion has a square shape, and wherein the head portion includes chamfered corners connecting to at least one of the piezoresistive measuring shunts.

10. A circuit arrangement implemented as an integrated semiconductor component and having a measured value acquisition circuit connectable to an analysis circuit, the circuit arrangement comprising:

piezoresistive measuring shunts diffused on a semiconductor substrate, the analysis circuit including the piezoresistive measuring shunts;

diffused terminal resistors having a negligible piezoresistive resistance, the diffused terminal resistors including identical, elongated, curved structures; and metallic terminal contacts connected to the piezoresistive measuring shunts by the diffused terminal resistors, wherein each of the curved structures has a first end for coupling to one of the piezoresistive measuring shunts and a second end, opposite the first end, for coupling to one of the metallic terminal contacts, each of the curved structures tapering toward the first end wherein each of the diffused terminal resistors includes:
a base body including a first area for connecting to the metallic terminal contacts,
a head portion having one of a rotational symmetry and a mirror symmetry and positioned at a predetermined distance from the base body, the head portion including a second area for connecting to the piezoresistive measuring shunts, the second area being smaller than the first area, and
a neck portion coupling the base body to the head portion, the neck portion having a cross section increasing from the head portion to the base body, wherein the metallic terminal contacts are positioned at a location of the base body, the location being positioned at a maximum distance away from the head portion, and wherein the head portion expands from the taper to a square or rectangular shape.

* * * * *